United States Patent [19]

Hedman

[11] Patent Number: 4,907,364
[45] Date of Patent: Mar. 13, 1990

[54] WEEDLESS, MULTI-DEPTH SINKING AND TOP WATER FISH LURES

[76] Inventor: Dean L. R. Hedman, 3302 78th St., Des Moines, Iowa 50322

[21] Appl. No.: 225,261

[22] Filed: Jul. 28, 1988

[51] Int. Cl.$^4$ .............................................. A01K 85/00
[52] U.S. Cl. ..................................... 43/42.39; 43/44.8
[58] Field of Search ................. 43/42.39, 42.24, 42.29, 43/44.8

[56] References Cited

U.S. PATENT DOCUMENTS

| | | | |
|---|---|---|---|
| 1,538,909 | 5/1925 | Shannon | 43/42.29 |
| 3,724,116 | 4/1973 | Lindner | 43/44.8 |
| 3,731,419 | 5/1973 | Candy | 43/42.28 |
| 4,219,956 | 9/1980 | Hedman | 43/42.39 |
| 4,244,133 | 1/1981 | Martinek | 43/42.39 |
| 4,367,607 | 1/1983 | Hedman | 43/42.24 |
| 4,672,768 | 6/1987 | Pippert | 43/42.24 |

Primary Examiner—Nicholas P. Godici
Assistant Examiner—Mike Starkweather
Attorney, Agent, or Firm—Zarley, McKee, Thomte, Voorhees & Sease

[57] ABSTRACT

A hard plastic jig head includes a cavity on its back side to receive the forward end of a soft, pliable body member mounted on a retainer and the barb of a fish hook. A ballast weight is placed at the rear bottom of the jig head to resist the tendency of the lure to rotate in the water and to provide a desired, horizontal orientation as the lure is retrieved. Dimples are provided on the soft, plastic body member to locate penetration points for the retainer and hook barb. One embodiment of the lure includes a bottom flat surface which is 10° to the horizontal and merges into a front upwardly extending surface at 40°–45° to the horizontal to maintain the lure horizontal as it is retrieved.

20 Claims, 3 Drawing Sheets

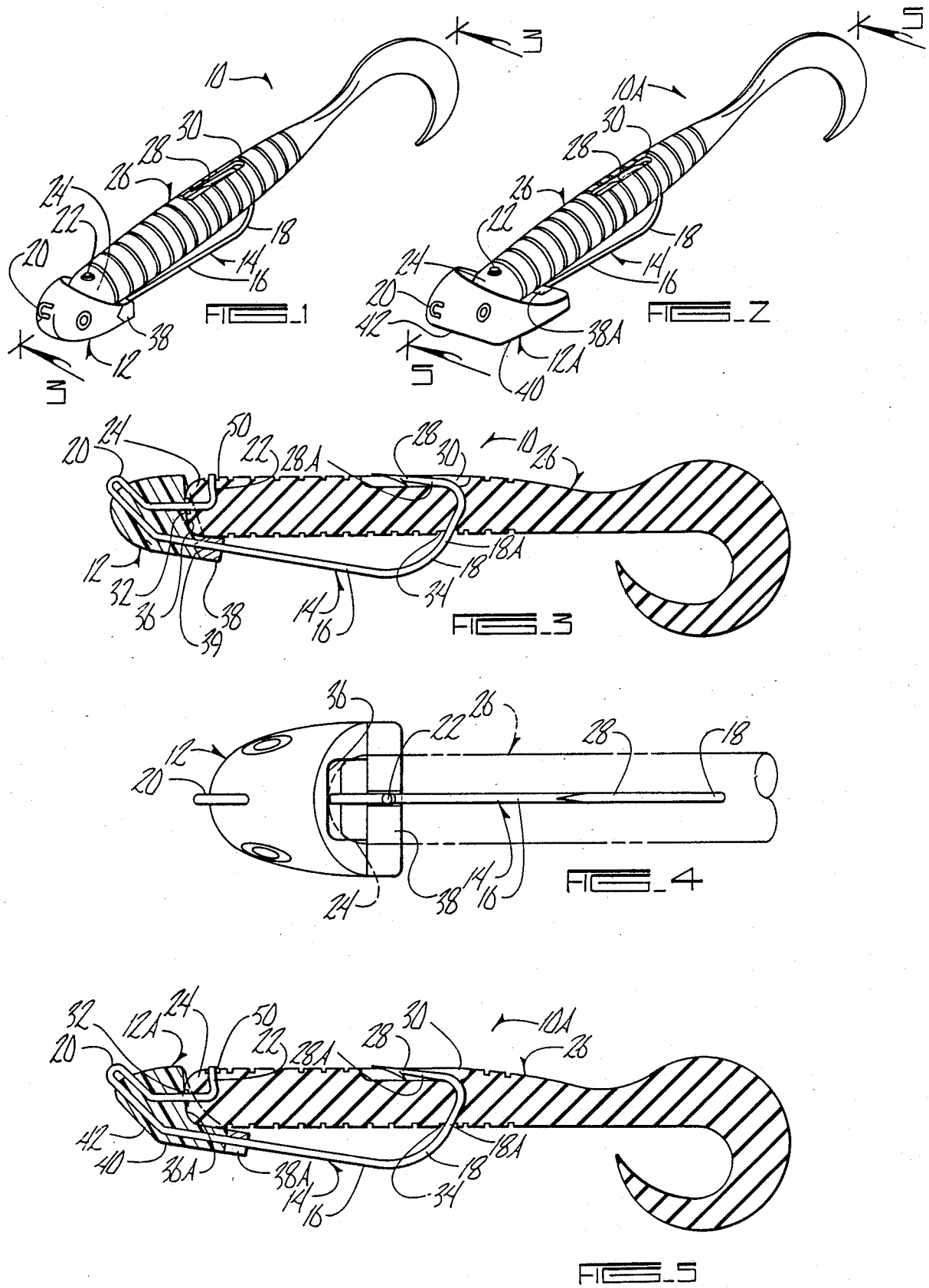

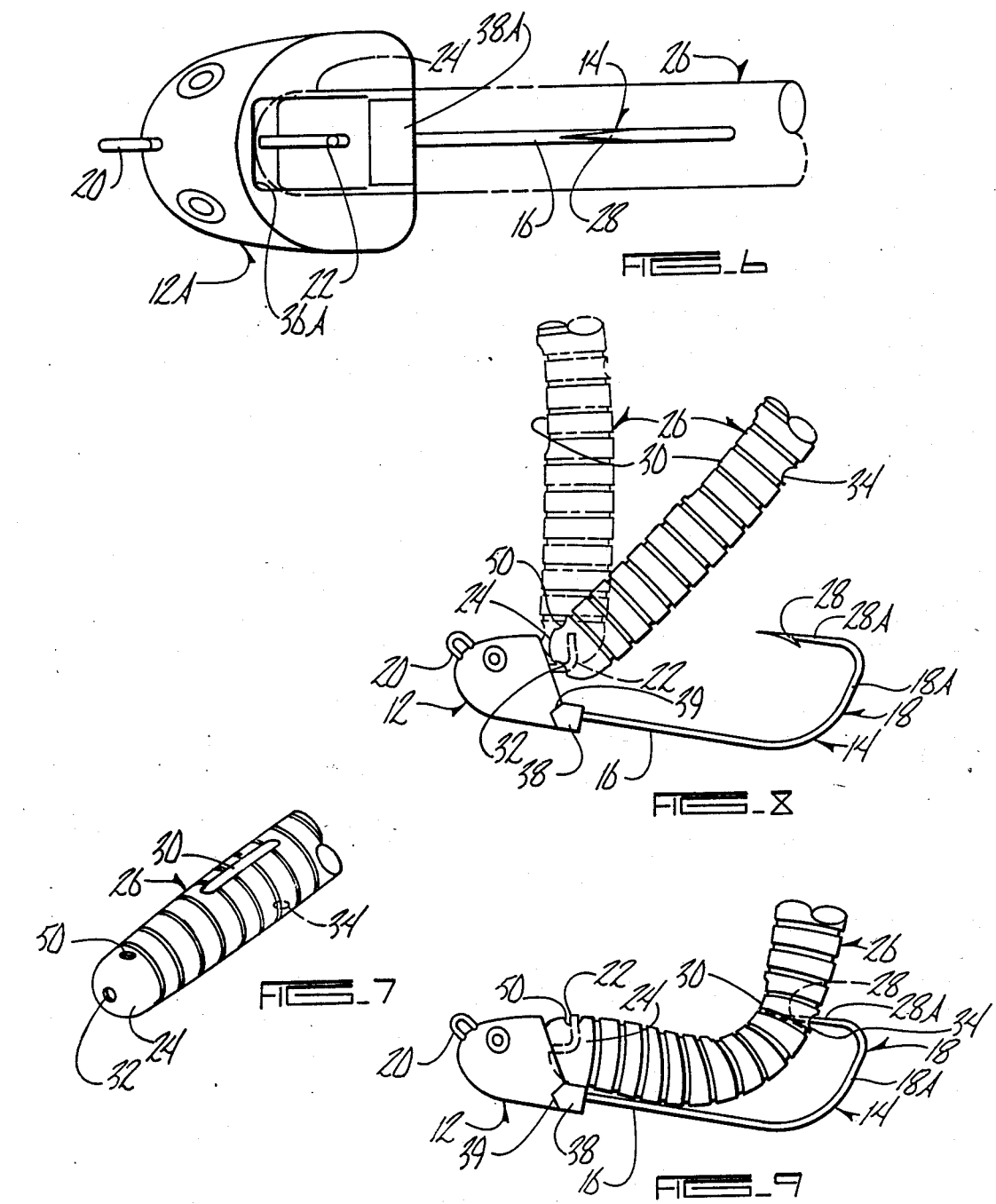

WEEDLESS, MULTI-DEPTH SINKING AND TOP WATER FISH LURES

BACKGROUND OF THE INVENTION

The fish lures of this invention utilize some of the basic features disclosed in my prior U.S. Pat. No. 4,367,607 dated Jan. 11, 1983. Common to both disclosures are the jig heads having a retainer extending rearwardly to receive the forward end of a pliable plastic body element with the hook being passed through the middle portion of the body.

What is now desirable is to have a lure which will perform in the water very naturally and as a part of the environment. The lure should descend progressively more slowly as it levels out. The lure may be pulled through the water but will resist water forces on the lure tending to rotate it. It is important to be able to control the depth at which the lure moves through the water such that it will stay on top or at any desired level, including along the bottom. The lure should, due to its balance, assume a generally horizontal position as it moves through the water. The forward end of the pliable plastic body on the retainer should be protected against being inadvertently dislodged by contact with obstructions in the water. Since the plastic pliable bodies are interchangeably mounted on the retainer and the hook, location marking indicia should be provided on the forward end, top side, and bottom side of the body element to provide an indicator for positioning on the retainer and the hook.

Ballast should be used in combination with a hard plastic jig head to give the desired balance, orientation in the water, and rate of descent in the water. The shape of the jig head along its bottom and forward side should be such that it will assist in maintaining the desired lure orientation and level in the water.

SUMMARY OF THE INVENTION

The fish lure of this invention has a number of important features. A hard plastic jig head includes, along its bottom and rear sides, lead ballast which resists the forces of the water tending to rotate or turn the lure upside down. The ballast is below the longitudinal axis of rotation of the lure.

The jig head on its back side includes a cavity in which the soft plastic body member is received and protected against dislodgment. The retainer extends rearwardly in the cavity for engagement with the forward end of the soft plastic body member.

The lure may include a flat bottom surface inclined ten degrees (10°) to the horizontal which merges with a surface extending forwardly and upwardly at 40°-45° to the horizontal to assure that the lure, as it is pulled through the water, is maintained level and does not descend into the water.

The width of the jig head is substantially wider than the plastic body member, and thus provides greater resistance to rotation and more floatation capability. The location of the ballast on the back side of the hard plastic jig head assures proper horizontal orientation and balance.

DESCRIPTION OF THE DRAWINGS

FIG. 1 is a perspective view of a multi-depth sinking lure.

FIG. 2 is a perspective view of an alternate embodiment for top water fishing.

FIG. 3 is a cross-sectional view taken along line 3—3 in FIG. 1.

FIG. 4 is a top plan view thereof.

FIG. 5 is a cross-sectional view taken along line 5—5 in FIG. 2.

FIG. 6 is a top plan view thereof.

FIG. 7 is a fragmentary perspective view of the plastic body member.

FIGS. 8 and 9 show steps in the assembly of the body member on the fish hook.

DESCRIPTION OF THE PREFERRED INVENTION

Figure 11:
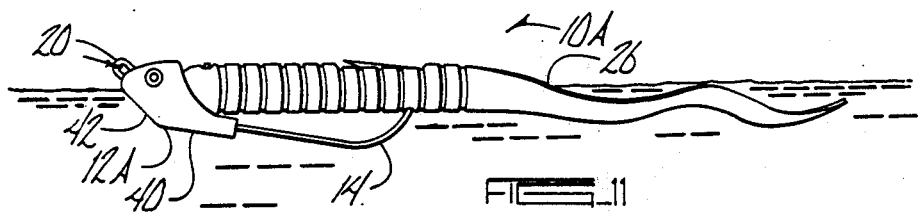
FIG. 11 is a side elevational view of the lure of FIG. 2 being used on the top of the water.

The weedless multi-depth sinking fish lure of FIG. 1 is referred to generally by the reference numeral, 10 while in FIG. 2 a modified fish lure is shown for fishing on the top of the water and is referred to generally by the reference numeral 10A.

The lure 10 includes a jig head 12 on a fish hook 14 having a shank 16 and a hook portion 18. The jig head 12 is of hard plastic material and has an eye 20 extending forwardly and upwardly through it from the fish hook shank 16. As seen in FIG. 3, an L-shaped retainer 22 is provided which engages the forward end 24 of a pliable, plastic body member 26. The hook portion 18 extends from the bottom side of the body member 26 therethrough with a barb 28 being received in a groove 30 on the top side of the body member. The hook portion 18 includes a substantially straight section 18A which merges at a substantially right angle corner into a straight barb section 28A. The plastic body 26 is nested in this corner and maintained in a horizontal orientation throughout all types of use.

In FIG. 7, a locating dimple 32 is seen on the forward end 24 of the body member 26 to mark the spot for penetration of the retainer 22. A similar dimple 34 is provided on the bottom side of the body member 26 to identify where the barb 28 should penetrate the body member. This greatly facilitates quickly mounting new body members on the lure as they may be interchanged frequently.

The jig head 12 includes a cavity 36 in which the forward end of the body member 26 is received. The cavity 36 includes bottom and oppositely disposed side walls that support and protect the body member from being dislodged on the retainer 22. It is seen that the forward wall in FIG. 3 extends at least as high as the top plane of the body member 26.

Figure 10:
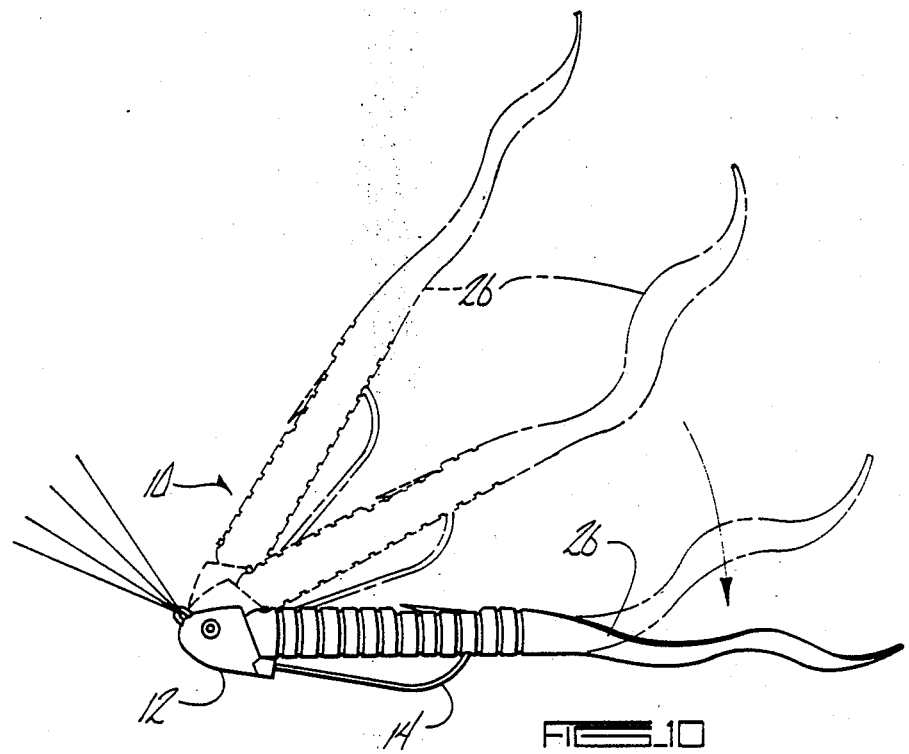
FIG. 10 is a side elevational view of the multi-depth lure and retrieving line in various positions after the lure has been cast.
Figure 12:
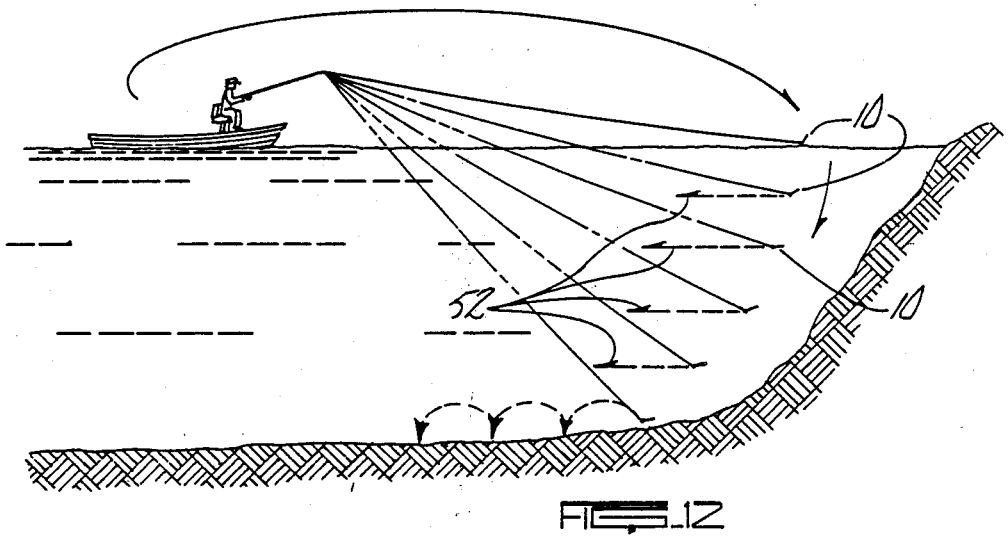
FIG. 12 is a side elevational view of a multi-depth lure being used and/or retrieved at varying elevations in the water.

It is desired that the multi-depth sinking lure 10 descend in the water but not at the rate of a solid lead jig head type lure. The jig head 12 is a combination of hard plastic, low density material and high density lead ballast material. A lead ballast element 38 extends across the back side of the jig head and is connected thereto by a cooperating tongue-and-groove joint 39. The ballast 38 is also mounted on the shank 16 of the fish hook. This location for the ballast limits the tendency of the lure to rotate about its longitudinal axis since the ballast is located below the longitudinal axis. This location also provides the desired balance such that the lure descends into the water and moves slowly into a horizontal position which is maintained as the lure is pulled through the water, as seen in FIGS. 10 and 12. The descent of the lure is progressively more slow as it levels out. An appropriate glue is used to further make the tongue-and-groove joint 39 permanent.

The lure 10A of FIGS. 2, 5, 6 and 11 is for fishing along the top of the water. The jig head 12A is substantially wider, as seen in FIG. 6, and includes a bottom surface 40 extending upwardly at a 10° angle to the horizontal and merges into an upwardly and forwardly extending front surface 42 extending at a 40°–45° angle to the horizontal. These two surfaces tend to cause the water to push the lure upwardly as it is pulled through the water to maintain the lure in a horizontal position and prevent the lure from descending while it is being pulled. Ballast 38A is seen in FIG. 6 positioned on the fish hook shank 16 in a recess in the jig head. The lead does not extend the full width of the jig head 12A. A cavity 36A is provided for the forward end of the body member 26.

The assembly of the body member is illustrated in FIGS. 8-9 and starts with the body member 26 being oriented in a vertical position, as shown in FIG. 8. The retainer 22 is aligned with the dimple 32 and penetrates the body member whereupon it is rotated clockwise such that the retainer 22 exits at a dimple 50. The barb 28 is then positioned at the dimple 34 for penetration therethrough and being received in the slot 30.

In FIGS. 10 and 12, the multi-depth sinking lure 10 is shown in its various positions as it is cast into the water and descends to the various elevations at which it is retrieved horizontally. It is seen that the lure may be retrieved near or at the surface or along the bottom and at elevations therebetween. The lure tends to level out faster to the horizontal position due to the use and location of the ballast 38. The multi-depth lure, as it enters the water after being cast, slowly and gradually settles to a level position while sinking. At any time while descending, it may be retrieved (moved forward in the water) and will of itself take a level position as indicated by the dash line arrows 52.

The lure of FIGS. 2, 5, 6, and 11 is ideally suited for fishing only on the top of the water due to the large flat area on the bottom which includes the 10° flat surface 40 and the 40°–45° front surface 42. These surfaces tend to direct the lure upwardly as it is pulled through the water offsetting the downward gravitational forces of the ballast 38A.

What is claimed is:

1. A weedless fish lure comprising,
   a hook means having a shank portion with forward and rearward ends, a pointed hook portion with a rearwardly disposed barb element connected to the pointed end of said hook portion and the other end of said shank portion having an eyelet connected to said forward end of said shank portion,
   a pliable body member having forward and rearward ends with a middle portion therebetween,
   retainer means operatively extending rearwardly from the forward end of said body member to detachably secure said forward end of said body member to said shank portion with said hook portion extending into said middle portion of said body member, and
   a head element on the forward end of said shank portion and having a rearwardly facing cavity in which said retainer means is positioned and the forward end of said pliable body member is received, said cavity including a bottom wall, opposite side walls and a front wall with said opposite side and bottom walls extending rearwardly along the forward end of said body member.

2. The structure of claim 1 wherein said front wall extends to the top of said body member to shield the forward end of said body member.

3. The structure of claim 1 wherein said forward end of said body member has a dimple on its longitudinal axial center and top side adjacent thereto to indicate where said retainer means is to extend into said body member and exit therefrom, said middle portion of said body member includes a dimple on its bottom side to indicate where said hook portion is to extend into said body member.

4. A weedless fish lure comprising,
   a hook means comprising an eyelet portion, a straight shank portion, and a hook portion all in a common plane, said shank having a forward and rearward ends where the forward end is connected to said eyelet portion and the rearward end connected to said hook portion; said hook portion comprising a pointed barb, a first straight portion relatively parallel to said shank and connected to said barb, a first curved portion connected to said first straight portion, a second straight portion connected to said first curved portion, a second curved portion connected between said second straight portion and said rearward end of said shank;
   a pliable body member having forward and rearward ends with a middle portion therebetween,
   retainer means operatively extending rearwardly from the forward end of said member to detachably secure said forward end of said body member to said shank portion with said hook portion extending into said middle portion of said body member,
   said body member including a top longitudinal alignment groove in which said first straight hook portion extends with the barb element being disposed substantially in said top groove.

5. The structure of claim 4 wherein said forward end of said body member has a dimple on its longitudinal axial center and top side adjacent thereto to indicate where said retainer means is to extend into said body member and exit therefrom, said middle portion of said body member includes a dimple on its bottom side to indicate where said hook portion is to extend into said body member.

6. A weedless fish lure comprising,
   a hook means having a shank portion with forward and rearward ends, a pointed hook portion with a rearwardly disposed barb element connected to the pointed end of said hook portion and the other end of said shank portion having an eyelet connected to said forward end of said shank portion,
   a pliable body member having forward and rearward ends with a middle portion therebetween,
   retainer means operatively extending rearwardly from the forward end of said body member to detachably secure said forward end of said body member to said shank portion with said hook portion extending into said middle portion of said body member,
   a head element of low density material on the forward end of said shank portion, said head element including top and bottom, front and rear, and opposite sides, and said bottom side is substantially flat and merges into said front side which is substantially flat and extends forwardly and upwardly to said top side, and a ballast element being positioned on said head element below said lure's longitudinal axis of rotation thereby tending to maintain said lure in an upright position in use.

7. The structure of claim 6 wherein said front side extends at an angle to the horizontal of between 40°–45°.

8. The structure of claim 7 wherein said bottom side extends at an angle to the horizontal of approximately 10°.

9. The structure of claim 6 wherein said ballast element is on the rear and bottom sides of said head element.

10. The structure of claim 6 wherein said forward end of said body member has a dimple on its longitudinal axial center and top side adjacent thereto to indicate where said retainer means is to extend into said body member an exit therefrom, said middle portion of said body member includes a dimple on its bottom side to indicate where said hook portion is to extend into said body member.

11. A weedless fish lure comprising:

a hook means having a shank portion with forward and rearward ends, a pointed hook portion with a rearwardly disposed barb element connected to the pointed end of said hook portion and the other end of said shank portion having an eyelet connected to said forward end of said shank portion, a pliable body member having forward and rearward ends with a middle portion therebetween, retainer means operatively extending rearwardly from the forward end of said body member to detachably secure said forward end of said body member to said shank portion with said hook portion extending into said middle portion of said body member, a low density non-metallic head element on the forward end of said shank portion, and a high density ballast means on said head element below its longitudinal axis of rotation thereby tending to maintain said lure in an upright position in use.

12. The structure of claim 11 wherein said head element has front, rear, top, and bottom and opposite sides, and said ballast means is located at the intersection of said rear and bottom sides.

13. The structure of claim 11 wherein said ballast means is mounted directly on said hook shank portion.

14. The structure of claim 13 wherein said rear side of said head element and said ballast means are interconnected by a tongue-and-groove joint.

15. The structure of claim 13 wherein said rear side of said head element includes a recess in which said ballast means is received.

16. The structure of claim 15 wherein said recess extends the full width of said head element.

17. The structure of claim 15 wherein said recess is positioned midway between the sides of said head element.

18. The structure of claim 11 wherein said head element is hard plastic and said ballast is lead.

19. The structure of claim 11 wherein said forward end of said body member has a dimple on its longitudinal axial center and top side adjacent thereto to indicate where said retainer means is to extend into said body member and exit therefrom, said middle portion of said body member includes a dimple on its bottom side to indicate where said hook portion is to extend into said body member.

20. The structure of claim 4 wherein said first and second straight portions interconnected by said first curved portion form an angle of substantially ninety degrees or less.

* * * * *